United States Patent
Kakino et al.

(10) Patent No.: US 8,504,178 B2
(45) Date of Patent: Aug. 6, 2013

(54) MULTIPLE REDUNDANT CONTROL SYSTEM

(75) Inventors: Atsushi Kakino, Komaki (JP); Hiroshi Saito, Komaki (JP); Takashi Oka, Komaki (JP); Masahiro Toyama, Komaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 226 days.

(21) Appl. No.: 12/710,642

(22) Filed: Feb. 23, 2010

(65) Prior Publication Data

US 2010/0222900 A1     Sep. 2, 2010

(30) Foreign Application Priority Data

Feb. 27, 2009 (JP) ................................. 2009-047362

(51) Int. Cl.
- G05B 9/02 (2006.01)
- G05B 11/01 (2006.01)
- G06F 11/00 (2006.01)

(52) U.S. Cl.
USPC ............. 700/81; 700/4; 700/20; 714/11

(58) Field of Classification Search
USPC ........... 700/3, 4, 9, 19, 20, 81–82; 714/11–13
See application file for complete search history.

(56) References Cited

U.S. PATENT DOCUMENTS

| | | | | |
|---|---|---|---|---|
| 3,636,331 A | * | 1/1972 | Amrehn | 700/82 |
| 5,757,641 A | * | 5/1998 | Minto | 700/4 |
| 7,424,642 B2 | * | 9/2008 | Howell et al. | 714/12 |
| 2004/0210322 A1 | * | 10/2004 | Takeuchi et al. | 700/21 |
| 2006/0212135 A1 | * | 9/2006 | Degoul et al. | 700/9 |

FOREIGN PATENT DOCUMENTS

| | | |
|---|---|---|
| JP | 2000-347707 | 12/2000 |
| JP | 2003-148108 | 5/2003 |

OTHER PUBLICATIONS

Japanese Office Action (and English translation thereof) issued Mar. 12, 2013 in Japanese Application 2009-047362.

* cited by examiner

*Primary Examiner* — Sean Shechtman
(74) *Attorney, Agent, or Firm* — Wenderoth, Lind & Ponack, L.L.P.

(57) ABSTRACT

In a multiple redundant control system each of the control systems detects whether failures occur in the system itself and the other systems, and outputs a control signal corresponding to an amount of control of a controlled object by the control system on the basis of the result of failure detection. In the multiple redundant control system at least one controlled object is driven or controlled by a controller having a plurality of control systems that are connected to each other and each output information regarding the system itself and received input of information regarding other systems. Based on control signals, a main control signal for driving or controlling the controlled object is generated by a main control signal generator.

5 Claims, 5 Drawing Sheets

MULTIPLE REDUNDANT CONTROL SYSTEM

BACKGROUND OF THE INVENTION

1. Field of the Invention

The present invention relates to a multiple redundant control system in which a plurality of controllers is used to control a single controlled object.

This application is based on Japanese Patent Application No. 2009-047362, the content of which is incorporated herein by reference.

2. Description of Related Art

In a control system that is applied to, for example, an airplane control-surface manipulating system or the like, redundancy is achieved by providing a plurality of controllers for controlling a single controlled object. Even when failures occur in one of the controllers, normal operation of the controlled object can be continued by the other controllers, so that the reliability of the control system as a whole is improved. As an example of such a control system, Japanese Unexamined Patent Application, Publication No. 2000-347707 discloses a technology in which a single controlled object is controlled by a dual control system including two controllers.

According to the technology disclosed in Japanese Unexamined Patent Application, Publication No. 2000-347707, each of the two controllers is capable of controlling the controlled object on its own, and one controller detects which of the control signals generated individually by the two controllers is more appropriate and controls the controlled object on the basis of the control signal detected as being more appropriate. That is, the configuration becomes complex because a controller must be provided to detect which control signal is more appropriate and should be used.

BRIEF SUMMARY OF THE INVENTION

The present invention has been made in order to overcome the problem described above, and it is an object thereof to achieve redundancy of control systems for a controlled object without adding complexity to the configuration so that even when failures occur in one of the control systems, the control of the system as a whole is not affected, and thus the reliability of the system as a whole can be improved.

An aspect of the present invention provides a multiple redundant control system in which at least one controlled object is driven or controlled by a controller having a plurality of control systems, wherein a plurality of control systems are connected to each other so that each of the plurality of control systems outputs information of the self control system and receives input of information of the other control system or systems, and each of the plurality of control channels includes a control system failure detecting unit that detects whether failures occur in the self control system or the other control system or systems and a controlling element that outputs a control signal corresponding to an amount for control of the controlled object by the self control system on the basis of a result of failure detection by the control-system failure detecting unit, and wherein the multiple redundancy control system includes a main control signal generator that generates a main control signal for driving or controlling the controlled object on the basis of the control signal output from the controlling element.

According to the aspect described above, the controller has a plurality of control systems, and the plurality of control systems are connected to each other so that each of the plurality of control systems outputs information of the self control system and receives information of the other control system or systems. Such a configuration is called a CCDL (cross channel data link), and information can be mutually communicated via a connection formed by a cable capable of transmitting electrical signals. Thus, for example, it is possible to output information owned by a specific control system or information received from the outside to the other control system or systems and to receive information owned by the other control system or systems and information received from the outside.

Furthermore, each of the plurality of control systems includes a control system failure detecting unit that detects whether failures occur in the self control system and the other control system or systems. When failures occur in one of the plurality of control systems, it is not preferable to continue the operation of the control system, so that it is detected whether failures occur in the self control system or the other control system or systems. Each of the plurality of control systems includes a controlling element that outputs a control signal corresponding to an amount for control of the controlled object by the self control system on the basis of the result of failure detection by the control system failure detecting unit.

That is, when all of the plurality of control systems are operating normally, all the control systems are capable of generating and outputting control signals equally and independently. On the other hand, when failures occur in any of the control systems, the controlling element of the failure control system is not able to generate and output a valid control signal. Thus, on the basis of the results of failure detection by the control system failure detecting units, only the control systems under normal operation equally and independently generate control signals and output the control signals to the main control signal generator. The main control signal generator generates a main control signal for driving or controlling the controlled object on the basis of the control signals output from the controlling elements of the individual control systems.

Specifically, for example, when three control systems are provided, if all the control systems are operating normally, each of the controlling elements generates a control signal that serves as an output signal for one third of a main control signal and outputs the control signal to the main control signal generator. The main control signal generator receives the output control signals from the three control systems and generates a main control signal, for example, by adding together the control signals. On the other hand, when failures occur in one of the three control systems, only two control systems operate normally, so that each of the controlling elements of the two control systems generates a control signal that serves as an output signal for one half of a main control signal and outputs the control signal to the main control signal generator. The main control signal generator generates a main control signal on the basis of the two control signals. Furthermore, when failures occur in two of the three control systems, only one control system operates normally, so that only the normally operating control system generates and outputs a control signal. Thus, the normally operating control system generates a control signal that serves as an output equivalent to an output of a main control signal and outputs the control signal to the main control signal generator.

In the aspect described above, preferably, each of the plurality of control systems further includes a controlled object failure detecting unit that detects whether failures occur in the controlled object and that outputs a failure signal for the controlled object to the main control signal generator when controlled object failure is detected, and the main control signal generator generates, on the basis of the failure signal, a main failure signal for stopping driving of the controlled object.

Since it is preferable not to continue the driving of the controlled object failure, it is necessary to stop the driving of the controlled object. Thus, each of the plurality of control systems further includes a controlled object failure detecting unit that detects whether failures occur in the controlled object and that outputs a failure signal to the main control signal generator when controlled object failure is detected. Upon detecting the failure, the controlled object failure detecting unit generates a failure signal for the controlled object and outputs the failure signal to the main control signal generator. Since a plurality of control systems is provided, failure signals for the same controlled object are generated by a plurality of controlled object failure detecting units. Thus, the main control signal generator generates a main failure signal on the basis of the plurality of failure signals, for example, by calculating the logical multiplication thereof. The generated main failure signal is output to the controlled object, and the driving of the controlled object is stopped on the basis of the input of the main control signal.

In the aspect described above, preferably, the controlled object outputs its own driving status as feedback information to the plurality of control systems.

Since the controlled object outputs its own driving status as feedback information to the plurality of control systems, the plurality of control systems is able to recognize the driving status of the controlled object on the basis of the feedback information. That is, by recognizing the driving status of the controlled object, for example, it is possible to detect whether the controlled object is being driven according to the main control signal.

In the aspect described above, preferably, the control-system failure detecting unit detects whether failures occur in the self control system or the other control system or systems on the basis of the feedback information input from the controlled object and the feedback information input from the other control system or systems.

Since the control systems are connected to each other via a CCDL, it is possible to communicate the feedback information from the controlled object with the control systems. Although the pieces of feedback information output from the controlled object to the individual control systems are assumed to be the same information, for example, when failures occur in any of the control systems, a difference can occur in the pieces of feedback information communicated with the control systems. Thus, it is possible to detect whether failures occur in the control systems.

In the aspect described above, preferably, the controlled object failure detecting unit detects whether failures occur in the controlled object on the basis of the feedback information input from the controlled object and the feedback information input from the other control system or systems.

In the aspect described above, the control systems are able to recognize the driving status of the controlled object on the basis of the feedback information. That is, by recognizing the driving status of the controlled object, for example, it is possible to detect whether the controlled object is being driven according to the main control signal. For example, when the controlled object is an actuator, the feedback information may include position information of the actuator, speed information of a motor, and pressure value information. When the actuator is operating normally, the feedback information represents values or information in predetermined ranges. On the other hand, when the feedback information represents unexpected values or information, failures conceivably occur in the actuator. In this manner, it is possible to detect whether failures occur in the controlled object on the basis of the feedback information.

As described above, according to the present invention, it is possible to achieve redundancy of control systems for a controlled object without adding complexity to the configuration so that even when failures occur in one of the control systems, the control of the system as a whole is not affected, and thus the reliability of the system as a whole can be improved.

DETAILED DESCRIPTION OF THE INVENTION

Now, an embodiment of a multiple redundant control system according to the present invention will be described with reference to the drawings.

Figure 1:
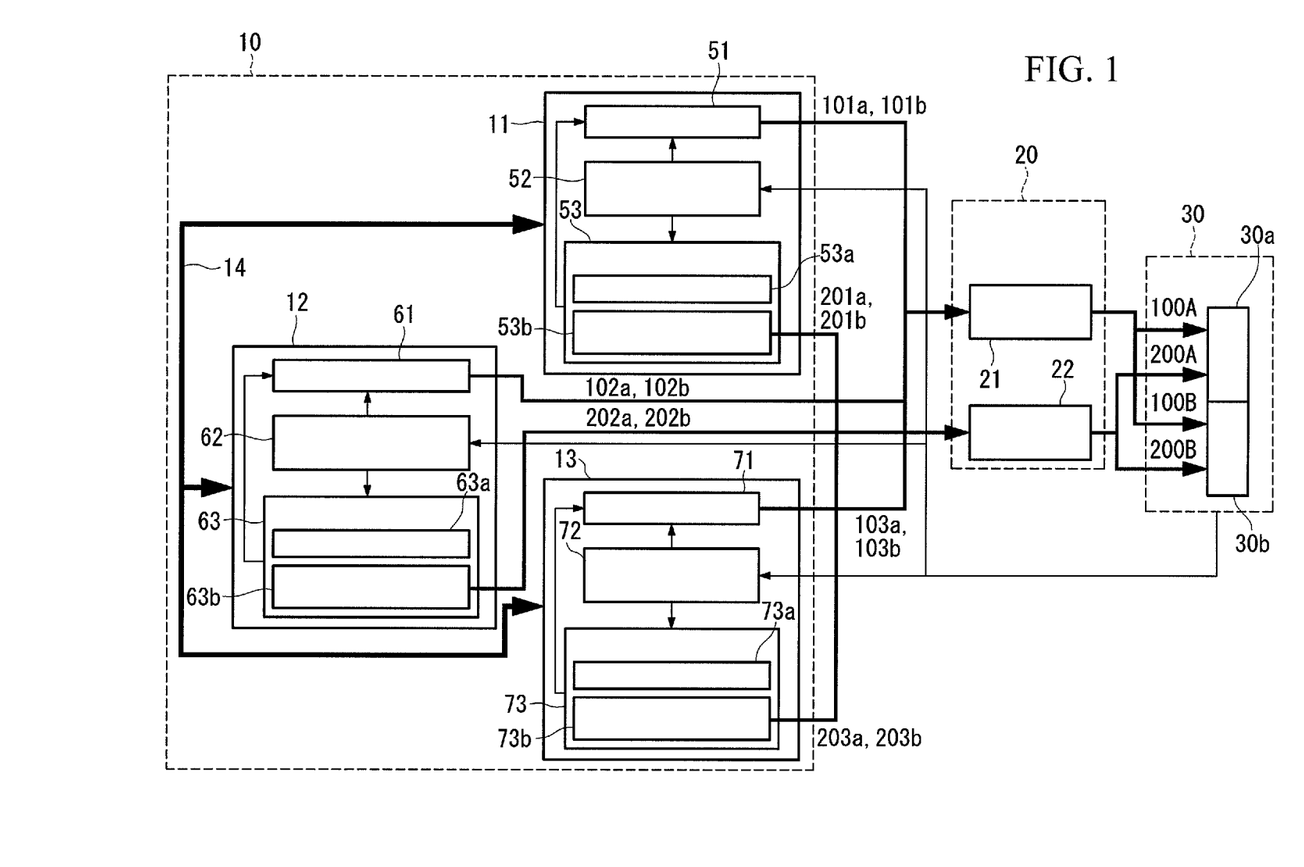
FIG. 1 is a block diagram schematically showing the configuration of a multiple redundant control system according to an embodiment of the present invention.

FIG. 1 is a block diagram schematically showing the configuration of the multiple redundant control system according to this embodiment. The multiple redundant control system according to this embodiment is applied to, for example, control of actuators that drive the control surfaces of an airplane or actuators that drive the gimbals of a rocket engine. As shown in FIG. 1, the multiple redundant control system according to this embodiment includes a controller 10 having a plurality of control systems, a main control signal generator 20, and controlled objects 30.

The controller 10 has a plurality of control systems 11, 12, and 13 for controlling the controlled objects 30, so that the controller 10 has redundancy. The control systems 11, 12, and 13 are connected to each other by a CCDL 14 so that information can be communicated between them. The controlled objects 30 include controlled objects 30a and 30b, such as actuators. The controller 10 drives or controls the controlled objects 30 via the main control signal generator 20.

For convenience of description, it is assumed that, in this embodiment, the controller 10 is a three redundant system controller having the three control systems 11, 12, and 13, and that the controlled objects 30 are double redundant controlled objects including the controlled objects 30a and 30b. Hereinafter, the reference sign "30" is used to simply denote all the controlled objects, and the reference signs "30a", "30b", and so forth are used to denote the individual controlled objects.

The control system 11 of the controller 10 includes a controlling element 51, a feedback signal processing unit 52, and a failure detecting unit 53. The controlling element 51 generates a control-command calculation result 101a for driving the controlled object 30a and a control-command calculation result 101b for driving the controlled object 30b according to commands from a main controller, which is not shown, and outputs these control-command calculation results 101a and 101b to the main control signal generator 20, which will be described later.

The feedback-signal processing unit 52 receives feedback information, such as position information of actuators, speed information of motors, and pressure information, from various sensors (not shown) attached to the controlled objects 30a and 30b. The feedback-signal processing unit 52 executes predetermined processing on the feedback information to recognize the driving status of the controlled objects 30a and 30b, and outputs the feedback information to the controlling element 51, the failure detecting unit 53, and the other control systems 12 and 13.

The failure detecting unit 53 includes a control-system failure detecting unit 53a and a controlled object failure detecting unit 53b. The control-system failure detecting unit 53a detects whether its own control system, i.e., failures occur in the control system 11 (hereinafter, the term "self" is used to indicate a system or information belonging to or associated with a particular device, and "other" is used to indicate a system or information belonging to or associated with another device), and the other control systems 12 and 13 on the basis of the feedback information input to the self control system 11 and the feedback information and the status information of the other control systems 12 and 13 obtained from the other control systems 12 and 13 via the CCDL 14.

The feedback information input to the failure detecting unit 53 from the feedback-signal processing unit 52 and the feedback information input from the other control systems 12 and 13 via the CCDL 14 are assumed to be the same information. Thus, these pieces of feedback information are compared with each other, and it is detected on the basis of whether these pieces of feedback information differ from each other whether failures occur in the self control system 11 or one of the other control systems 12 and 13. The status information of the self control system 11 or one of the other control systems 12 and 13, obtained as a result of the failure detection, is output to the other control systems 12 and 13 via the CCDL 14.

The controlled object failure detecting unit 53b detects whether failures occur in the controlled objects 30a and 30b on the basis of the feedback information input to the self control system 11 and the feedback information and the status information of the other control systems 12 and 13 obtained from the other control systems 12 and 13 via the CCDL 14. First, on the basis of the feedback information, which serves as a basis for failure detection, the driving status of the controlled objects 30a and 30b is recognized. As described above, the feedback information input to the failure detecting unit 53 from the feedback-signal processing unit 52 and the feedback information input from the other control systems 12 and 13 via the CCDL 14 are assumed to be the same information. Thus, it is detected whether the recognized driving status of the controlled objects 30a and 30b is the same as the driving status of the controlled objects 30a and 30b recognized on the basis of the feedback information obtained from the other control systems 12 and 13 via the CCDL 14, and it is detected whether failures occur in the controlled object 30a or 30b on the basis of the recognized driving status. If failure of the controlled object 30a is detected as a result of the failure detection, an engage-command calculation result 201a is output to the main control signal generator 20. On the other hand, if failure of the controlled object 30b is detected, an engage-command calculation result 201b is output to the main control signal generator 20.

Similarly to the control system 11, the control systems 12 and 13 include controlling elements 61 and 71, feedback-signal processing units 62 and 72, and failure detecting units 63 and 73. These components have functions similar to the functions of the corresponding components of the control system 11 described above, so that descriptions thereof will be omitted.

The main control signal generator 20 includes a control-command generator 21 and an engage-command generator 22. The control-command generator 21 adds together the control-command calculation results 101a, 102a, and 103a for the controlled object 30a, input from the control systems 11, 12, and 13, thereby generating a single control command 100A for driving or controlling the controlled object 30a. Similarly, the control-command generator 21 adds together the control-command calculation results 101b, 102b, and 103b for the controlled object 30b, input from the control systems 11, 12, and 13, thereby generating a single control command 100B for driving or controlling the controlled object 30b. The generated control command 100A is output to the controlled object 30a, and the generated control command 100B is output to the controlled object 30b. An adder can be used as the control-command generator 21. In this case, the control-command generator 21 has a simple configuration and high reliability.

The engage-command generator 22 calculates the logical multiplication of the engage-command calculation results 201a, 202a, and 203a for the controlled object 30a, input from the control systems 11, 12, and 13, thereby generating an engage command 200A for the controlled object 30a. Similarly, the engage-command generator 22 calculates the logical multiplication of the engage-command calculation results 201b, 202b, and 203b for the controlled object 30b, input from the control systems 11, 12, and 13, thereby generating an engage command 200B for the controlled object 30b. The generated engage command 200A is output to the controlled object 30a, and the generated engage command 200B is output to the controlled object 30b.

Next, a control operation performed by the thus-configured multiple redundant control system will be described.

When all the control systems 11, 12, and 13 are operating normally, the controlling elements 51, 61, and 71 of the control systems 11, 12, and 13 respectively generate the control-command calculation results 101a, 102a, and 103a for the controlled object 30a and the control-command calculation results 101b, 102b, and 103b for the controlled object 30b, and output these control-command calculation results 101a, 102a, 103a, 101b, 102b, and 103b to the control-command generator 21 of the main control signal generator 20. At this time, the control-command calculation results 101a, 102a, and 103a are electrical signals based on equivalent amounts for control, and the control command 100A is generated by adding together the control-command calculation results 101a, 102a, and 103a. That is, each of the control-command calculation results 101a, 102a, and 103a is an output that accounts for one third of the control command 100A generated by the control-command generator 21. Similarly, the control-command calculation results 101b, 102b, and 103b are electrical signals based on equivalent amounts for control, and the control command 100B is generated on the basis of the control-command calculation results 101b, 102b, and 103b. The generated control commands 100A and 100B are output to the controlled objects 30a and 30b, respectively, so that the controlled objects 30a and 30b are driven or controlled according to the individual control commands 100A and 100B.

On the other hand, when failures occur in one of the control systems 11, 12, and 13, for example, when failures occur in the control system 11, the controlling elements 61 and 71 of the control systems 12 and 13 respectively calculate the control-command calculation results 102a and 103a for the controlled object 30a and the control-command calculation results 102b and 103b for the controlled object 30b, and outputs these control-command calculation results 102a, 103a, 102b, and 103b to the control-command generator 21 of the main control signal generator 20. At this time, the control-command calculation results 102a and 103a are electrical signals based on equivalent amounts for control, and the control command 100A is generated by adding together the control-command calculation results 102a and 103a. That is, the control-command calculation results 102a and 103a compensate for the absence of the control-command calculation result 101a from the control system 11, and each of the control-command calculation results 102a and 103a is an output that accounts for one half of the control command 100A generated by the control-command generator 21. Similarly, the control-command calculation results 102b and 103b are electrical signals based on equivalent amounts for control, and the control command 100B is generated on the basis of the control-command calculation results 102b and 103b. The generated control commands 100A and 100B are output to the controlled objects 30a and 30b, respectively, so that the controlled objects 30a and 30b are driven or controlled according to the individual control commands 100A and 100B.

When failures occur in two of the control systems 11, 12, and 13, for example, when failure occur in the control systems 11 and 12, the controlling element 71 of the control system 13 generates the control-command calculation result 103a for the controlled object 30a and the control-command calculation result 103b for the controlled object 30b and outputs these control-command calculation results 103a and 103b to the control-command generator 21. At this time, since the control-command calculation results 101a and 102a are not output from the other control systems 11 and 12, the control system 13 must drive the controlled object 30a on its own. Thus, the control-command calculation result 103a is an output equivalent to the control command 100A. Similarly, the control-command calculation result 103b is an output equivalent to the control command 100B. The control-command calculation results 103a and 103b are converted to the control commands 100A and 100B by the control-command generator 21 of the main control signal generator 20. The converted control commands 100A and 100B are output to the controlled objects 30a and 30b, respectively, so that the controlled objects 30a and 30b are driven or controlled according to the individual control commands 100A and 100B.

Furthermore, in the thus-configured multiple redundant control system, whether failure is detected in the control systems 11, 12, and 13 by the following manner.

The feedback-signal processing units 52, 62, and 72 receive feedback information, such as position information of actuators, speed information of motors, and pressure values, input from the controlled objects 30a and 30b driven according to the control commands 100A and 100B. The feedback-signal processing units 52, 62, and 72 recognize the driving status of the controlled objects 30a and 30b, output the input feedback information to the controlling elements 51, 61, and 71 and the failure detecting units 53, 63, and 73, and communicate feedback information mutually among the control systems 11, 12, and 13.

In the failure detecting units 53, 63, and 73, the control-system failure detecting units 53a, 63a, and 73a detect whether failures occur in their individual self control systems and the other control systems on the basis of the feedback information input to the self control system and the feedback information and the status information of the other control systems obtained from the other control systems via the CCDL 14.

That is, when all the control systems 11, 12, and 13 are operating normally, the feedback information input to their individual self control systems coincides with the feedback information obtained from the other control systems via the CCDL 14, so that it is detected that all the control systems 11, 12, and 13 are in normal operation. On the other hand, when failures occur in any of the control systems 11, 12, and 13, the feedback information input to their individual self control systems does not coincide with the feedback information obtained from the other control systems via the CCDL 14. Thus, which of the control system failure is detected on the basis of the driving status of the controlled objects 30a and 30b assumed from all the feedback information and the feedback information that does not coincide. This method is call cross monitoring.

Furthermore, in order to detect whether failures occur in their individual self control systems, in the individual control systems 11, 12, and 13, it is checked whether the values of the feedback information fall within the expected ranges of the values. This method is called self monitoring. The status information regarding whether the control systems 11, 12, and 13 are operating normally or failure, obtained as results of the cross monitoring and self monitoring, is output to the other control systems via the CCDL 14. The processing described above is executed by each of the control systems 11, 12, and 13, and the output levels of the control commands output from the controlling elements 51, 61, and 71 of the control systems 11, 12, and 13 are detected on the basis of the status information of all the control systems.

For example, when failures occur in the control system 11, only the feedback information input to the self control system 11 does not coincide with the feedback information obtained from the other control systems 12 and 13 via the CCDL 14. Thus, the failure detecting unit 53 of the control system 11 detects failure of the self control system 11 on the basis of the driving status of the controlled objects 30a and 30b recognized from all the feedback information and the feedback information directly input to the self control system 11 from the controlled objects 30a and 30b, and outputs failure status information of the self control system 11 and normal status information of the control systems 12 and 13 to the controlling element 51 and the other control systems 12 and 13. The controlling elements 51, 61, and 71 of the control systems 11, 12, and 13 detect the output levels of control commands on the basis of the status information. That is, the controlling element 51 of the control system 11 outputs no control command because of the failure, and the controlling elements 61 and 71 of the control systems 12 and 13 respectively output the control-command calculation results 102a and 103a equally having half the amount for control compared with the control command 100A and output the control-command calculation results 102b and 103b equally having half the amount for control compared with the control command 100B.

When failures occur in the control system 12 additionally, the control system 13 is not able to detect whether the feedback information of the control system 12 obtained via the CCDL 14 or the feedback information of the control system 13 is correct information. Thus, the operation of the controlled objects 30a and 30b is estimated from the feedback information by performing calculation, the status of the self control system 13 is detected by comparison with the results of the calculation, and the output levels of the control commands 100A and 100B are detected accordingly. That is, the controlling element 61 of the control system 12 does not output the control commands 100A and 100B because of the failure, and the controlling element 71 of the control system 13 outputs the control-command calculation result 103a for the control command 100A and the control-command calculation result 103b for the control command 100B.

Whether failures occur in the controlled objects 30a and 30b detected in the following manner. The controlled object failure detecting units 53b, 63b, and 73b detect whether failures occur in the controlled objects 30a and 30b on the basis of the feedback information input to their individual self control systems and the feedback information and the status information of the other control systems obtained from the other control systems via the CCDL 14. That is, when failures occur in the controlled objects 30a and 30b, none of the controlled object failure detecting units 53b, 63b, and 73b generates an engage-command calculation result, so that engage commands are not input to the controlled objects 30a and 30b. Thus, the controlled objects 30a and 30b are driven continuously under the control of the controller 10.

On the other hand, when failures occur in either the controlled object 30a or the controlled object 30b, the driving status of the controlled objects 30a and 30b is recognized on the basis of the feedback information input to their individual self control systems and the feedback information and the status information of the other control systems obtained from the other control systems via the CCDL 14. Specifically, when failures occur in the controlled objects 30a or 30b, the failures are detected by the following manner. When the control systems 11, 12, and 13 are operating normally, if the values of input feedback information exceed the assumed ranges, each of the control systems 11, 12, and 13 is able to detect this situation properly. Thus, a failure of the controlled objects 30a or 30b is detected when the results of detection by all the control systems operating normally coincide as a result of comparison of the results of detection by the control systems 11, 12, and 13. Furthermore, depending on the devices constituting the controlled objects 30a and 30b (e.g., electric motor drivers), if a failure detection function specific to the devices is provided, the results of failure detection by the device-specific functions are captured as feedback information and are used for failure detection of the controlled objects 30a and 30b.

Upon detecting that the controlled object 30a or the controlled object 30b failure, the controlled object failure detecting units 53b, 63b, and 73b generate the engage-command calculation results 201a, 202a, and 203a for the controlled object 30a or the engage-command calculation results 201b, 202b, and 203b for the controlled object 30b and output the engage-command calculation results 201a, 202a, and 203a or 201b, 202b, and 203b to the engage-command generator 22 of the main control signal generator 20. In the engage-command generator 22, when the engage-command calculation results 201a, 202a, and 203a are input, the logical multiplication thereof is calculated to generate the engage command 200A for the controlled object 30a. Similarly, when the engage-command calculation results 201b, 202b, and 203b are input, the logical multiplication thereof is calculated to generate the engage command 200B for the controlled object 30b. The generated engage command 200A or 200B is output to the controlled object 30a or 30b to stop or control the driving of the controlled object 30a or 30b upon receiving the engage command 200A or 200B.

Figure 2:
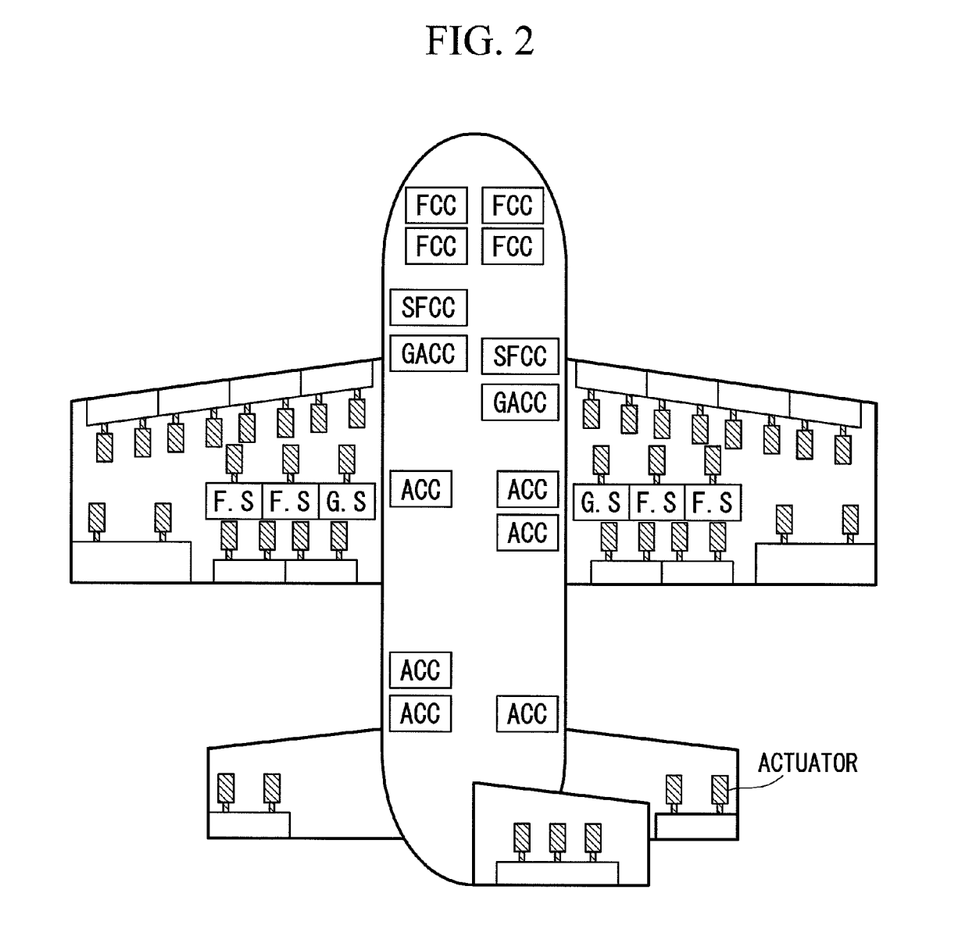
FIG. 2 is a reference diagram showing an example case where the multiple redundant control system according to the embodiment of the present invention is applied to actuators that drive the control surfaces of an airplane.
Figure 3:
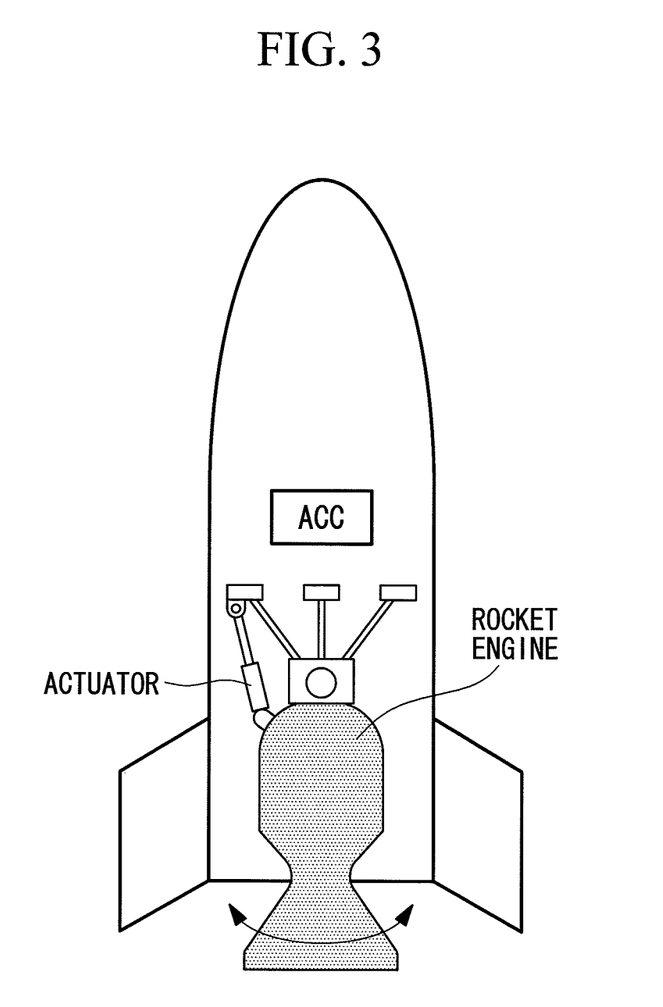
FIG. 3 is a reference diagram showing an example case where the multiple redundant control system according to the embodiment of the present invention is applied to actuators that drive the gimbals of a rocket engine.

As described earlier, the thus-configured multiple redundant control system can be applied to, for example, control of actuators that drive the control surfaces of an airplane or actuators that drive the gimbals of a rocket engine. FIG. 2 is a reference diagram showing an example where the system is applied to actuators that drive the control surfaces of an airplane. In FIG. 2, the hatched parts are actuators that serve as the controlled objects, and an ACC (actuator control computer) serving as the controller and the main control signal generator drives or controls the actuators. Furthermore, FIG. 3 is a reference diagram showing a case where the system is applied to actuators that drive the gimbals of rocket engines. The actuators shown in FIG. 3 serve as the controlled objects, and an ACC serving as the controller and the main control signal generator drives or controls the actuators.

Figure 4:
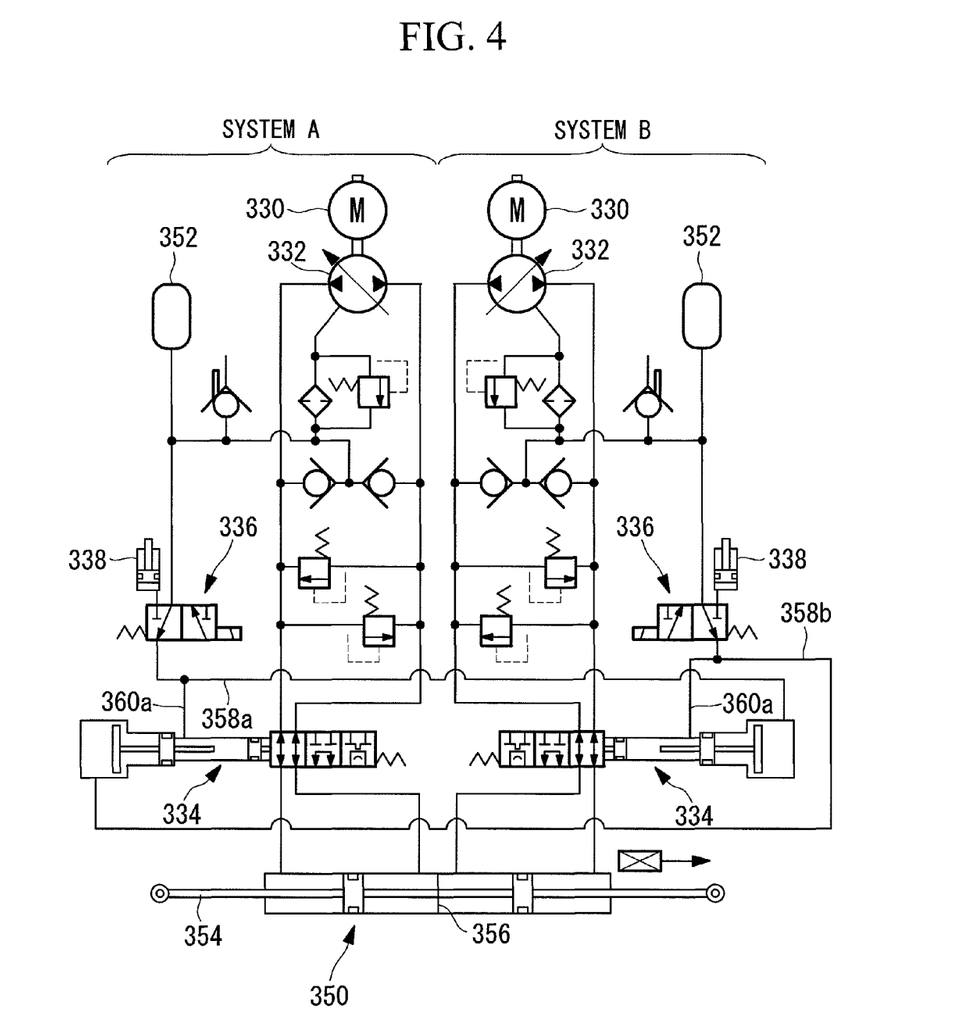
FIG. 4 is a diagram showing an example of a hydraulic actuator system that can serve as a controlled object of the multiple redundant control system according to the embodiment of the present invention.
Figure 5:
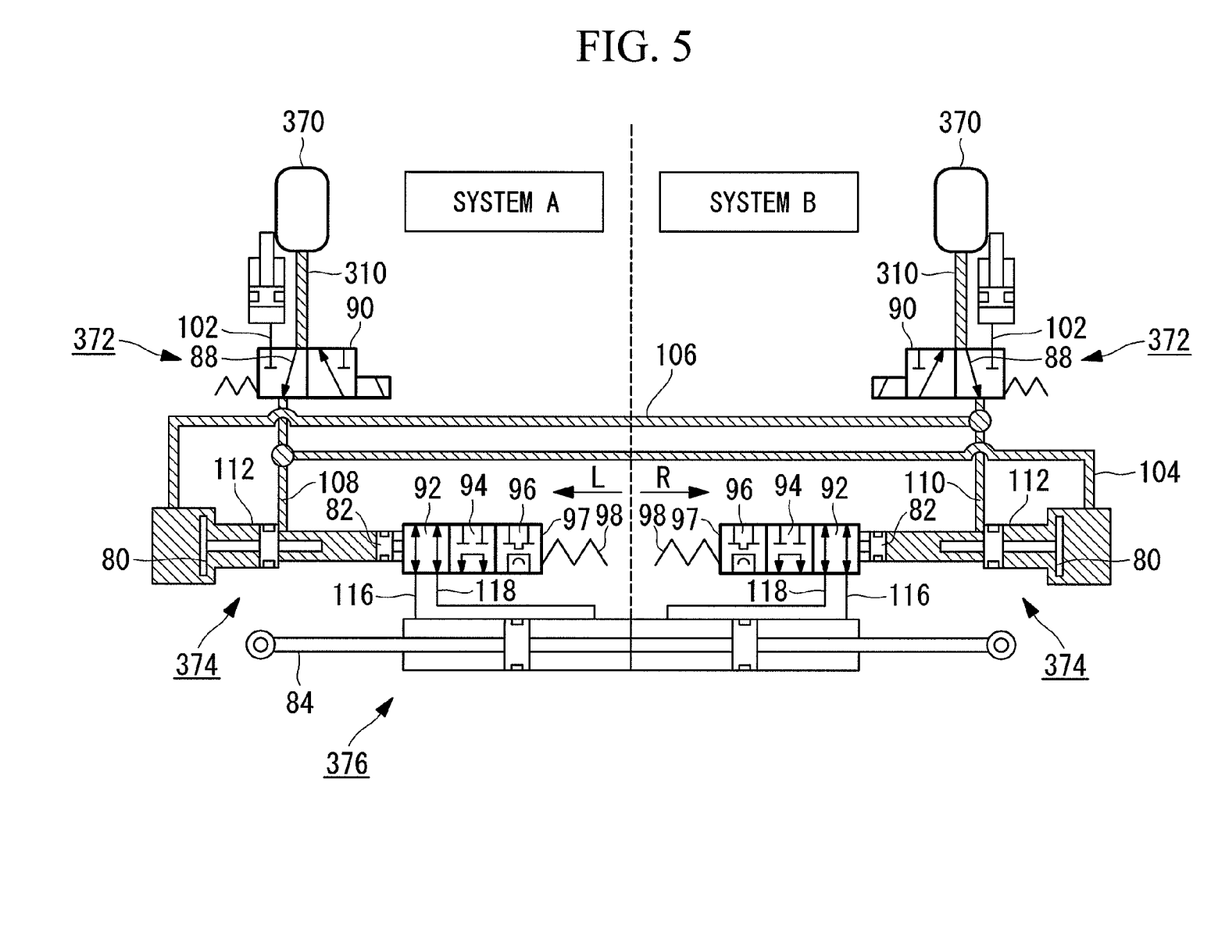
FIG. 5 is a diagram showing an example of a hydraulic actuator system that can serve as a controlled object of the multiple redundant control system according to the embodiment of the present invention.

As more detailed examples of controlled objects of the multiple redundant control system, FIGS. 4 and 5 show hydraulic actuator systems that can serve as controlled objects of multiple redundant control systems according to the present invention.

The actuator system shown in FIG. 4 is configured with two-system hydraulic circuits, namely, systems A and B, for a single hydraulic cylinder 350. The hydraulic cylinder 350 has a wall 356 in a main unit, and is divided by the wall 356 into a space where working fluid enters from system A and a space where working fluid enters from system B. Furthermore, systems A and B are configured to operate in synchronization with each other to move a piston rod 354 of the hydraulic cylinder 350.

An electric motor 330 is connected to a variable-displacement hydraulic pump 332, and the variable-displacement hydraulic pump 332 functions as a hydraulic source for moving the piston rod 354 of the hydraulic cylinder 350. Internal leakage of the variable-displacement hydraulic pump 332 is accumulated in an accumulator 352. The pressure that occurs at the accumulator 352 at this time is referred to as a case drain pressure.

The accumulator 352 is connected to a solenoid valve 336. The solenoid valve 336 is connected to a fail-safe valve 334 via a large-piston-side hydraulic circuit 358a and a small-piston-side hydraulic circuit 360a in the case of system A, and via a large-piston-side hydraulic circuit 358b and a small-piston-side hydraulic circuit 360b in the case of system B. Furthermore, a pop-up chamber 338 is connected to the solenoid valve 336.

FIG. 5 shows the status of fail-safe valves in a case where the two-system hydraulic circuits are operating normally. The operation of fail-safe valves 374 in a case where systems A and B are both operating normally will be described. First, system A will be described. At an accumulator 370 of system A, the case drain pressure of the variable-displacement hydraulic pump 332 is accumulated, and the hydraulic pressure is conveyed from a hydraulic circuit 310 between the accumulator 370 and a solenoid valve 372 to the fail-safe valve 374 via a feeding circuit 88 of the solenoid valve 372 by branching into a large-piston-side hydraulic circuit 104 and a small-piston-side hydraulic circuit 108. The large-piston-side hydraulic circuit 104 is connected to a fail-safe-valve hydraulic chamber 112 accommodating a large piston 80 of the fail-safe valve 374 of system B.

On the other hand, the small-piston-side hydraulic circuit 108 is connected to a fail-safe-valve hydraulic chamber 112 accommodating a small piston 82 of the fail-safe valve 374 of system A. Since the working fluid has a pressure, the small piston 82 of system A is pushed in a direction R shown in FIG. 5, and the large piston 80 of system B is pushed in a direction L shown in FIG. 5. A spool valve 97 has a normal state 92, a bypass state 94, and a dumped state 96, and the spool valve 97 is pressed by a spring 98 toward the small piston 82. In the state shown in FIG. 5, the small piston 82 pushes the spool valve 97 in the direction R shown in FIG. 5, so that the spool valve 97 enters the normal state 92, whereby the spool valve 97 is connected to ejecting hydraulic circuits 116 and 118. That is, a connection is formed so that hydraulic pressure is conveyed between the variable-displacement hydraulic pump 332 and a hydraulic cylinder 376.

Next, system B will be described. At an accumulator 370 of system B, the case drain pressure of the variable-displacement hydraulic pump 332 is accumulated, and the hydraulic pressure is conveyed from a hydraulic circuit 310 between the accumulator 370 and a solenoid valve 372 to the fail-safe valve 374 via a feeding circuit 88 of the solenoid valve 372 by branching into a large-piston-side hydraulic circuit 106 and a small-piston-side hydraulic circuit 110. The large-piston-side hydraulic circuit 106 is connected to the fail-safe-valve hydraulic chamber 112 accommodating a large piston 80 of the fail-safe valve 374 of system A.

On the other hand, the small-piston-side hydraulic circuit 110 is connected to the fail-safe-valve hydraulic chamber 112 accommodating a small piston 82 of the fail-safe valve 374 of system B. Since the working fluid has a pressure, the small piston 82 of system B is pushed in a direction L shown in FIG. 5, and the large piston 80 of system A is pushed in a direction R shown in FIG. 5. A spool valve 97 has a normal state 92, a bypass state 94, and a dumped state 96, and the spool valve 97 is pressed by a spring 98 toward the small piston 82. In the state shown in FIG. 5, the small piston 82 pushes the spool valve 97 in the direction L shown in FIG. 5, so that the spool valve 97 enters the normal state 92, whereby the spool valve 97 is connected to ejecting hydraulic circuits 116 and 118. That is, a connection is formed so that hydraulic pressure is conveyed between the variable-displacement hydraulic pump 332 and the hydraulic cylinder 376.

When the engage command 200A or the engage command 200B is input to the hydraulic actuator system described above, if failures occur in either one of system A and system B, the solenoid valve 372 of system A or system B having received the engage command 200A or 200B switches the fail-safe valve 374 to the bypass state 94. Similarly, when the generated engage command 200A or the engage command 200B is input to the hydraulic actuator system, if failures occur in both system A and system B, each of the solenoid valves 372 is switched to the dumped state 96. The engage command 200A or 200B stops the driving of the electric motor 330 of the relevant system regardless of the operation status of the fail-safe valve 374.

As described above, with the multiple redundant control system according to this embodiment, it is possible to achieve redundancy of control systems for a controlled object without adding complexity to the configuration so that even when failures occur in one of the control systems, the control of the system as a whole is not affected, and thus the reliability of the system as a whole can be improved.

In the configuration of the embodiment described above, the controller 10 has the three control systems 11, 12, and 13, and the three control systems 11, 12, and 13 control the two controlled objects 30a and 30b. However, the configuration is not limited to the above configuration, and the configuration may be such that four or more control systems are provided or such that one controlled object or three or more controlled objects are controlled.

What is claimed is:

1. A multiple redundant control system in which at least one controlled object is driven or controlled by a controller having a plurality of control systems,
   wherein the plurality of control systems are connected to each other so that each of the plurality of control systems outputs information regarding the control system itself and receives input of information regarding the other control system or systems,
   wherein each of the plurality of control systems includes:
   a control-system failure detecting unit that detects whether failures occur in the control system itself or the other control system or systems; and
   a controlling element that calculates an amount for control of a controlled object on the basis of a number of the other control system or systems that are determined to be operating normally, calculation of the amount of control by the controlling element being performed at a time that the control-system failure detecting unit determines that the control system itself is operating normally, and
   wherein the multiple redundant control system comprises:
   a main control signal generator that generates a main control signal for driving or controlling the controlled object by adding up the amounts calculated by the controlling element of each of the plurality of control systems.

2. A multiple redundant control system according to claim 1,
   wherein each of the plurality of control systems further comprises:
   a controlled object failure detecting unit that detects controlled object failure and that outputs a failure signal for the controlled object to the main control signal generator when it is detected that failures occur in the controlled object, and
   wherein the main control signal generator generates, on the basis of the failure signal, a main failure signal for stopping of the driving of the controlled object detected to have a failure.

3. A multiple redundant control system according to claim 2,
   wherein the controlled object outputs its own driving status as feedback information to the plurality of control systems, and
   wherein the controlled object failure detecting unit detects whether failures occur in the controlled object on the basis of the feedback information input from the controlled object and feedback information input from the other control system or systems.

4. A multiple redundant control system according to claim 1, wherein the controlled object outputs its own driving status as feedback information to the plurality of control systems.

5. A multiple redundant control system according to claim 4, wherein the control-system failure detecting unit detects whether failures occur in the control system itself or the other control system or systems on the basis of the feedback information input from the controlled object and feedback information input from the other control system or systems.

* * * * *